United States Patent [19]
Willis et al.

[11] 4,426,678
[45] Jan. 17, 1984

[54] D.C. TO D.C. CONVERTER

[75] Inventors: Albert E. Willis; John M. Gould; Jack L. Matheney, all of Huntsville; Harrison Garrett, Decatur, all of Ala.

[73] Assignee: The United States of America as represented by the Administrator of the National Aeronautics and Space Administration, Washington, D.C.

[21] Appl. No.: 383,083

[22] Filed: May 28, 1982

[51] Int. Cl.³ .................................. H02M 3/335
[52] U.S. Cl. ...................... 363/25; 363/65; 363/67; 363/71
[58] Field of Search .............. 363/16, 22–26, 363/39, 40, 44–46, 50, 64–65, 67–71, 82, 90–91, 125–126, 128

[56] References Cited
U.S. PATENT DOCUMENTS

| | | | |
|---|---|---|---|
| 3,559,030 | 1/1971 | Bussard | 363/71 X |
| 3,628,123 | 12/1971 | Rosa et al. | 363/64 X |
| 4,062,057 | 12/1977 | Perkins et al. | 363/25 X |
| 4,159,513 | 6/1979 | Gemp et al. | 363/71 X |
| 4,218,646 | 8/1980 | Akamatsu | 363/71 X |

Primary Examiner—Peter S. Wong
Attorney, Agent, or Firm—Joseph H. Beumer; John R. Manning; Leon D. Wofford, Jr.

[57] ABSTRACT

The object of the invention is to provide an improved converter for converting one direct current voltage to another.

A plurality of phased square wave voltages are provided from a ring counter (14) through amplifiers ($A_{O1}$-$A_{O6}$) to a like plurality of output transformers (TO). Each of these transformers has two windings, and $S^1$ winding and an $S^2$ winding. The $S^1$ windings are connected in series, then the $S^2$ windings are connected in series, and finally, the two sets of windings are connected in series. One of six SCRs (SCRs 1–6) is connected between each two series connected windings to a positive output terminal (22) and one of diodes (D1–D6) is connected between each set of two windings of a zero output terminal (0). By virtue of this configuration, a quite high average direct current voltage is obtained, which varies between full voltage and two-thirds full voltage rather than from full voltage to zero. Further, its variation, ripple frequency, is reduced to one-sixth of that present in a single phase system.

5 Claims, 3 Drawing Figures

D.C. TO D.C. CONVERTER

ORIGIN OF THE INVENTION

The invention described herein was made by employees of the United States Government and may be manufactured and used by or for the government of the United States for governmental purposes without the payment of any royalties thereon or therefor.

DESCRIPTION

Technical Field

This invention relates generally to devices for converting one direct current voltage to another direct current voltage, and particularly to a device of this character wherein an original direct current voltage is, in the process of conversion, first translated into a multiphase alternating current signal.

Background Art

Direct current to direct current converters have been in existence for 60 years or more, being widely used in early automobile radios for transforming 6 volts D.C. to typically 180 to 300 volts to be used as a plate or anode voltage supply for vacuum tubes. Typically, the direct current was changed to alternating current by a vibrating type interrupter, and then the alternating current was stepped up to the desired voltage and finally rectified.

Since that time, while the need for high anode voltages for radios have disappeared with the advent of the transistor, there has remained the need for step-up D.C. to D.C. conversion for certain applications. One of these has been as a power source of electrical ion propulsion of space vehicles in outer space. In such case, relatively low battery voltages, e.g., 100 to 200 volts, would be stepped up to voltages in excess of 1,000 volts. For such usage, understandably, weight and reliability considerations are of upmost importance.

In accordance with these considerations, it is to be appreciated that a converter must have a low component count for both reliability and weight, and its design must desirably call for lightweight elements and, ideally, tolerate some circuit element failure without there being a substantial electrical failure. No known converter appears to meet these requirements, and, accordingly, it became the object of this invention to determine a direct current to direct current converter, to-wit, a converter which was of lightweight construction, had a low component count, and was of a design which enabled continued operation despite some component failures.

It is a further object of this invention to provide a converter wherein more than one direct current voltage could be generated without significant increase in component count or basic hardware.

SUMMARY OF THE INVENTION

In accordance with this invention, a plurality of power transformers are separately driven by time displaced square wave signals developed from a battery powered signal source. Each transformer has at least a first and second output winding, and these windings are connected in series, first a set of first windings, and then a set of second windings. The last winding of the second windings is connected in a closed ring to the first windings of the transformers. One rectifying device is connected from the interconnection of each two succeeding sets of windings to one common D.C. terminal, and another rectifying device is connected between the same interconnection and an opposite polarity D.C. terminal, the rectifying devices being poled to pass current in the same direction.

DETAILED DESCRIPTION OF THE DRAWINGS

Figure 1:
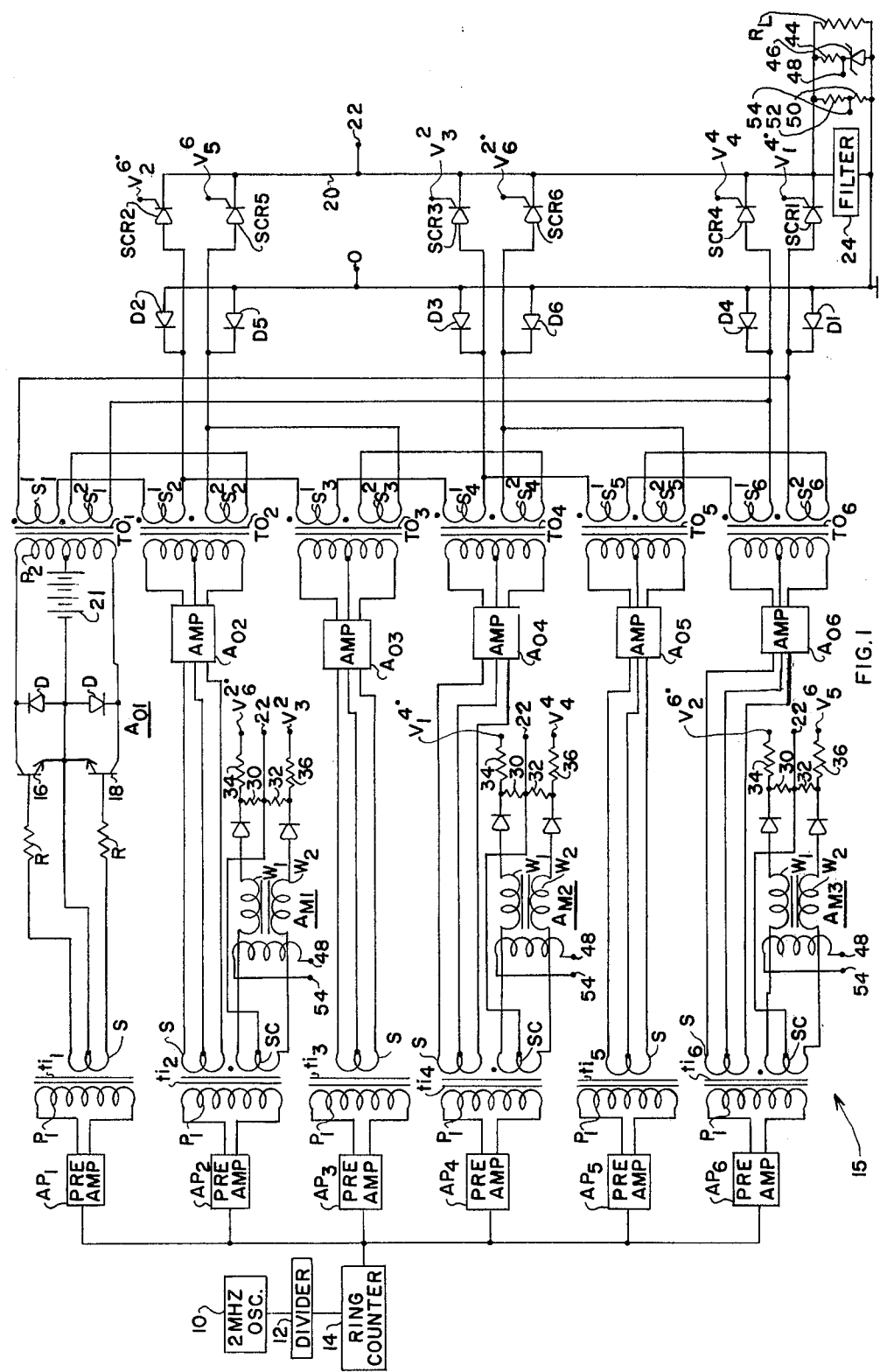
FIG. 1 is an electrical schematic diagram of an embodiment of the invention.

Referring first to FIG. 1, oscillator 10 generates a base frequency for converter 15, for example, a frequency of 2 MHz. This frequency signal is then fed to divider 12 which divides down the frequency to a frequency of 125 KHz and feeds the resulting frequency signal to ring counter 14, which functions conventionally to provide, as an output, a series, in this case, six, square wave outputs which are at a rate of approximately 10 KHz and are spaced in time, one-sixth of one-half cycle apart, and may be represented by the waveforms $V_1$–$V_6$ shown in FIG. 3. These waveforms appear with varying amplitude through each of the six channels of signal flow as shown. Each of these time displaced signals is fed to one of pre-amplifiers $AP_1$–$AP_6$, and the output of each pre-amplifier is separately fed to the primary winding $P_1$ of one of input transformers $ti_1$–$ti_6$. Each of transformers $ti_1$–$ti_6$ has a center tapped secondary winding and a drive input to an output amplifier $A_0$. There are six of these output amplifiers, and each is further designated by a numerical subscript to label the amplifiers as $A_{01}$–$A_{06}$.

The six power output amplifiers are identical, and thus only one of them, amplifier $A_{01}$, is shown in detail. It is a conventional push-pull type switching transistor amplifier wherein the center tap of winding S connects to the emitters of transistors 16 and 18 and to the negative terminal of power supply battery 21 from which power to be converted is derived. The outer terminals of winding S are connected through resistors R to bases of transistors 16 and 18, respectively. The positive terminal of battery 21 is connected to the center tap of primary winding $P_2$ of an output transformer of transformers $TO_1$–$TO_6$, and the outer terminals of the winding are connected to the collectors of transistors 16 and 18, respectively. A pair of diodes D connects between the emitters of the transistors and outer terminals of winding $P_1$ to thereby enable commutation of the circuit when transistors 16 and 18 turn off. Each of amplifiers $A_{01}$–$A_{06}$ power one of output transformers $TO_1$–$TO_6$, and thus each of these transformers is fed an amplified wave signal which is a replica of a like numbered waveform of waveforms $V_1$–$V_6$ shown in FIG. 3. Each of these transformers has two secondary windings, these being labeled in terms of the transformer number and whether it is the first or second winding of that transformer. Thus, as shown, the first winding of transformer $TO_1$ is indicated as $S^1_1$, and the second winding is designated by $S^2_1$, whereas in the case of transformer $TO_2$, the subscript is changed to a 2, and thus the like windings are labeled $S^1_2$ and $S^2_2$. Each winding provides a like selected voltage output.

Figure 3:
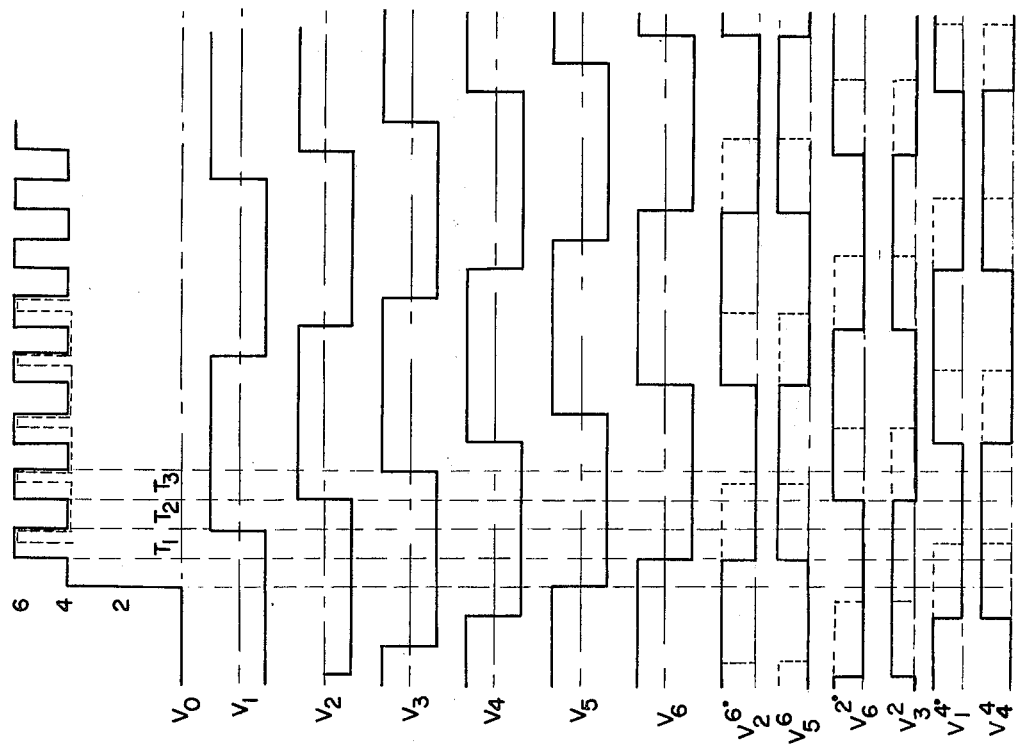
FIG. 3 illustrates a series of waveforms illustrative of operation of the invention.
Figure 2:
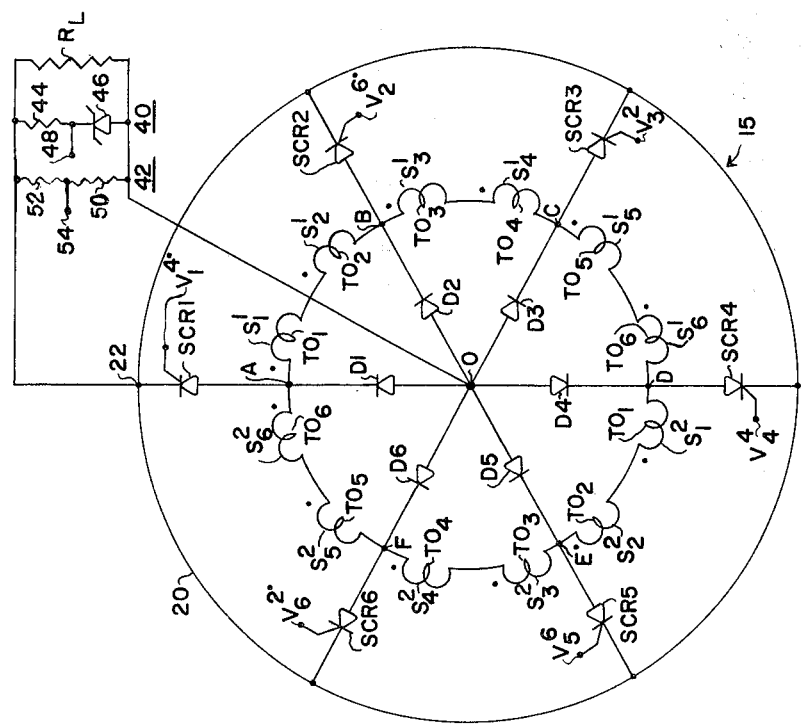
FIG. 2 is an electrical schematic diagram of the interconnection of certain basic circuit elements.

As a feature of this invention, the secondary windings are connected as best shown in FIG. 2 wherein, starting at point A and proceeding clockwise, the $S^1_1$ and $S^1_2$ windings of transformers $TO_1$ and $TO_2$ are connected in series between points A and B, the $S^1_3$ and $S^1_4$ windings of transformers $TO_3$ and $TO_4$ are connected in series between points B and C, and the $S^1_5$ and $S^1_6$ windings of transformers $TO_5$ and $TO_6$ are connected in series between points C and D. Next, the secondary windings $S^2_1$–$S^2_6$ of transformers $TO_1$–$TQ_6$ are connected in series, with the $S^2_1$ and $S^2_2$ windings of transformers $TO_1$ and $TO_2$ being connected in series between points D and E, the $S^2_3$ and $S^2_4$ windings of transformers $TO_3$ and $TO_4$ being connected between points E and F, and the $S^2_5$ and $S^2_6$ windings of transformers $TO_5$ and $TO_6$ being connected between points F and A. As will be noted, the phasings of the two sets of windings is reversed at point D, this being indicated by the position of the dots at the windings, the voltage at a dot end with respect to a non-dotted end being as shown in FIG. 3.

Examining these voltages, the first in time frame $T_1$, it will be noted that all of the transformer windings provide a negative voltage (at a dot end). With this posture, if one proceeds to examine the right side of the diagram of FIG. 2, there will have been generated at point D, with respect to point A, six positive voltage units (at the non-dotted end with respect to a dotted end), one for each winding, and this total is indicated by voltage $V_0$ for this time frame. Likewise, if one proceeds around the left side of FIG. 2, the transformer windings will produce a like +6 voltage units at point D with respect to point A. Thus, in this posture, it is obvious tha two distinct sources of like voltages are being provided. Accordingly, if a single winding should fail, there is this redundancy.

Next, in time frame $T_2$, it will be noted that voltage $V_1$, the voltage illustrative of the outputs of each of windings $S^1_1$ and $S^2_1$ reverses, with the result that voltages between points A and B and between points D and E become zero. Thus, there appears at both points D and E at +4 voltage units with respect to points A and B, and thus the $V_0$ voltage in time frame $T_2$ available has dropped from +6 voltage units to +4 voltage units.

Next, in time frame $T_3$, it will be noted that waveform $V_2$ has gone positive, with the result that voltages across windings $S^1_2$ and $S^2_2$ reverse, and thus there is a +2 voltage units at point A with respect to point B and a +2 voltage units at point E with respect to point D. In this posture, and at this time, considering point B as a reference, or a 0 voltage point, it will be noted that there is a +6 voltage units contributed by the windings proceeding clockwise from point B to point E and in proceeding counterclockwise from point B to point E. Thus, the voltage ($V_0$) available has risen back to +6 voltage units. This pattern will continue to repeat itself through a complete cycle of waveforms $V_1$–$V_6$ and for each cycle thereafter.

The actual summing of voltages as a direct current output in accordance with voltage $V_0$ is achieved by the rectifying elements shown in FIGS. 1 and 2 consisting of diodes D1–D6 which connect between a like ordered set of points A-F and the ground, or negative terminal 0, and SCR units SCR1–SCR6 connected between like ordered points A-F and the positive output, terminal 22. In accordance with this system, the diodes and SCRs are like as in-line from center point 0 outward to positive bus 20.

The SCR units are chosen to effect a voltage control or voltage regulation. If such is not required, the SCR units may be replaced by like poled diodes.

The solid line version of voltage $V_0$ is illustrative of a full voltage output wherein either each of the SCRs is fully turned on when required to conduct, as will be described, or diodes are employed instead. For a better understanding of the operation of the circuitry, it will be assumed that the fully conductive case prevails, and by this, it is meant that each of the SCRs and diodes will conduct when they are forward biased.

In order to trace signal flow and operation with a direct current output, reference is again made to time frame $T_1$ wherein the voltage at point D with respect to point A is a +6 voltage units. The result will be that SCR4 will conduct, placing a +6 voltage units on outer conductive bus 20 with respect to center point 0, the zero or reference voltage output terminal. This means that SCR1, SCR2, SCR3, SCR5, and SCR6 are reverse biased. Likewise, diodes D2, D3, D4, D5 and D6 are all reverse biased, while diode D1 is forward biased. Accordingly, there will be current flow outward from point D, through SCR4, through bus 20 to positive output terminal 22, thence through output load, represented by load resistor $R_L$, back to center point 0, and thence through diode D1 to point A. Thus, a $V_0$ voltage of +6 voltage units is imposed across load $R_L$. It is to be noted that filter 24, shown in FIG. 1, has been omitted in FIG. 2 in order to best illustrate and describe the summation of voltages before being averaged.

Next, in time frame $T_2$, with a 0 voltage between points A and B and between points D and E as described, there will be a +4 voltage units at points D and E with respect to points A and B, and in this posture, SCR4 and SCR5 will both conduct to place a +4 voltage units on bus 20. SCR1, SCR2, SCR3, and SCR6 will be reverse biased, and diodes D3, D4, D5, and D6 will be reverse biased. Diodes D1 and D2 are forward biased. Accordingly, there will be a current flow from both of points D and E outward through SCR4 and SCR5 to bus 20, thence through resistor $R_L$, back to center point 0, and thence through diodes D1 and D2 to points A and B. The resulting +4 voltage units across resistor $R_L$ is illustrated by the voltage in time frame $T_2$ for voltage $V_0$ across resistor $R_L$.

Next, in time frame $T_3$, with a +2 voltage units at point A with respect to point B, and at point E with respect to point B, the circuit again provides a +6 voltage units, this time it being between point E with respect to point B. This will cause SCR5 to conduct, producing a +6 voltage units on bus 20, with the result that all other SCRs are reverse biased, as will be all diodes other than diode D2. As a result, there will be current flow outward through SCR5 to bus 20, thence to positive terminal 22, and then through resistor $R_L$ to the center or zero output terminal 0, and then back through diode D2 to point B. This +6 voltage units is indicated by $V_0$ in time frame $T_3$ of FIG. 3. This oscillation between +6 units and +4 units and then +6 units will continue for a full cycle of operation and then be repeated as waveforms $V_1$–Vrepeat.

As stated, the foregoing events will occur in the event that either the SCRs are on at pertinent times described, or else they are replaced by diodes.

The six waveforms commencing with $V^6_2$ and ending with $V^4_4$ of FIG. 3 are illustrative of gating waveforms for gating on the SCRs as discussed. The solid line portions of these waveforms would fully turn on the SCRs to produce the full solid line voltage output shown for $V_0$.

In order to effect voltage regulation of the output voltage across load $R_L$, that is, for example, maintain it at a selected value, the gating waveforms are varied in their turn-on time, being delayed in the event that the voltage across $R_L$ should rise above a selected value, and being advanced in time in the event voltage across $R_L$ should decrease below a selected value. In order to instrument such a system, it is necessary to choose an operating point such that with a selected output voltage across load $R_L$, the output voltage pulses shown at $V_0$ may be varied in width as needed to contribute more or less output voltage as variations in load or variations in battery voltage might change. Thus, for example, an operating point is illustrated in FIG. 3 wherein with a selected output voltage, the turn-on of each SCR is delayed from that which is indicated by the solid leading edge of the waveforms by an amount which will produce a filter output, by virtue of ripple filter 24 of FIG. 1.

The gating signals as shown in solid lines (undelayed) in FIG. 3 are derived from secondary windings SC on three of the input transformers, transformers $ti_2$, $ti_4$, and $ti_6$, as shown in FIG. 1. Each winding has a center tap brought out to a reference terminal 22 and two oppositely phased outer winding sides, each of the latter providing one of two oppositely phased outputs synchronized with one of the voltage phases illustrated in waveforms $V_1$-$V_6$, as shown. The outer side of a winding which is marked with a dot is an in-phase version of the driving signal appearing between that side of the winding and reference terminal 22. The voltage on the opposite winding side with respect to the reference terminal is, of course, one of a reverse phase. The reference terminals 22 are all connected together to a like numerical terminal of cathode bus 20 connected to the cathodes of SCR1, SCR2, SCR3, SCR4, SCR5 and SCR6.

Each of the gating signals is fed through either the $W_1$ or $W_2$ winding of one of identical magnetic amplifiers of magnetic amplifier circuit $A_{M1}$-$A_{M3}$ shown in FIG. 1 where the signal appears across one of resistors 30 or 32, and thence is fed through one of resistors 34 and 36 to a terminal bearing a signal designation corresponding to the gating waveform shown by the same designation in FIG. 3 and to like labeled gate terminals of an SCR to be triggered by that signal. The magnetic amplifiers effect a delay on a gating signal which is an inverse function of the degree of amplifier saturation, which in turn is a direct function of a common control voltage which is developed from the filtered output voltage of the converter, between terminal 22 and ground (terminal 0) in FIG. 1. The filtered voltage is the average of the ripple voltage shown in waveform $V_0$.

Examining the gating waveform voltages, the solid line versions occur when magnetic amplifiers $A_{M1}$-$A_{M3}$ are fully saturated and produce no signal delay. Circuitry is provided to obtain a control voltage which varies, over a desired operating range, inversely with the converter output voltage. In this way, if the output voltage tends to rise above a selected value, a decrease in control voltage will decrease the saturation level of the magnetic amplifiers and produce greater delays in the gating signals. This in turn will decrease the circuitry producing the control voltage to be maintained. The circuitry providing this control voltage consists of two voltage divider networks 40 and 42 connected across the output of converter 15. The first of these consists of resistor 44 and zener diode 46 to thus provide at intersecting point 48 a constant voltage. A second network consists of resistors 50 and 52 connected across the output of the converter, and at the intersecting terminal point 54, there is thus provided a voltage with respect to terminal point 48 which varies directly with output voltage. As shown, this voltage is applied as a control input to each of magnetic amplifiers $A_{M1}$-$A_{M3}$. The values of resistors 50 and 52 are chosen so that with a selected battery voltage and output load, the control voltage will produce a degree of saturation of the magnetic amplifiers, which will produce a desired output voltage across that load. Then, a change in converter output or load voltage will produce a change in control voltage, increasing or decreasing in a direction so as to counter changes in the output voltage. Thus, for example, if the voltage across load $R_L$ should start to increase, the result will be that the voltage at terminal 54 will rise approaching that at terminal 48, and the resulting control voltage applied to the magnetic amplifier will decrease. Thus, the saturation level of the magnetic amplifiers will decrease to produce a longer delay in the turn-on of the SCRs. This in turn, as will be further explained, will decrease the output to effect a return of the output voltage to the selected value. Conversely, if the output voltage across load $R_L$ should decrease, the voltage at terminal 54 would tend to go lower, and the difference of voltage between terminals 54 and 48 will increase, causing the saturation level of the magnetic amplifiers to increase, producing less delay in the control gate signals to the SCRs and causing a rise in output voltage back to the selected value.

Examining the gating voltage waveforms, it will be observed that no effect is caused by delaying one of the gating waveforms until the delay exceeds two time frame units. Thus, considering time frame $T_1$ and the case where current flow is to be through SCR4, the gating waveform $V^4_4$ is the gating signal involved; and since the gating signal does not have to be on until the commencement of the third segment of the third gating waveform, it will be appreciated that this is so.

In order to demonstrate the operation of achieving voltage control by varying the gating time, it will be noted that in waveform $V^4_4$, the dashed line shows the gating waveform delayed by approximately $2\frac{1}{2}$ time increments. Thus, in this case, cathode SCR4 turns on at this time point, and it will be noted that the voltage $V_0$ rises from a +4 unit voltage level to a +6 units level at this time. Actually, in practice, the gating point would typically not be delayed to this degree, and the dashed line would typically be closer to the left, and operation would move left and right a small distance as needed to provide output voltage pulses to achieve a desired output voltage.

Following the full turn-on of SCR4 as indicated, and with the transition to the next time period, the output voltage $V_0$ would drop back to a +4 voltage unit in the same manner and at the same time as if no control voltage were present. Thus, the control function determines only the turn-on time of an appropriate SCR, the one to conduct at a full +6 voltage units level. This is illustrated by the dashed line gating pulse for each of the gating waveforms.

The circuitry shown illustrates the development of a single direct current output voltage, but the system is particularly adapted to enable multiple voltage or current sources to be provided. In order to provide a second power output in the same manner described, a second set of two windings each would be provided as secondary windings of output transformers $TO_1$–$TO_6$, and an additional control winding would be provided on a selected three of the transformers. These three would supply gating signals through separate magnetic amplifiers to SCRs connected in circuit with the added windings of the output transformers.

Further, while magnetic amplifier control of the SCRs is shown, it is to be appreciated that other forms of gating control of the SCRs may be used, such as by employment of a zero crossing detector fed from a ramp waveform and an error signal from the output voltage.

From the foregoing, it is to be appreciated that the present invention provides a direct current to direct current converter which has few components and is made reasonably lightweight and at reasonable cost. Further, it is to be appreciated that by virtue of the redundant generation of voltages that the loss of one, or perhaps two, of the transformer windings will not effect a system failure. Actually, it is possible that in such case, by virtue of the voltage control system, the remaining circuits simply provide a higher output voltage to make up for the loss.

We claim:
1. A D.C. to D.C. converter comprising:
signal generating means for generating a plurality of trains of rectangular-shaped signals wherein one train is displaced in time from another train;
a direct current power supply;
a like plurality of switching means, each being connected in circuit with said power supply, and responsive to one of said trains of rectangular-shaped signals for providing a power signal as an output during one half cycle of said rectangular-shaped signal;
a like plurality of transformers, each having at least one primary winding and at least two, first and second, secondary windings, and said primary winding being connected to and powered from the output of one said switching means;
said secondary windings of said transformers being connected in a series circuit consisting of a first series string consisting of said first windings of each said transformer, followed by and including a second series string consisting of said second windings, and wherein the entire series connected windings form a ring configuration;
a first common terminal of one polarity, and a second common terminal of an opposite polarity, and a load circuit being connectable between said terminals;
a plurality of rectifying circuits, each comprising a pair of rectifying devices connected in series between said terminals, and each having a midpoint terminal between said first and second terminals, and both rectifying devices being poled to pass current in a single direction between said first and second terminals;
a said mid-point terminal of each rectifying circuit, between rectifying devices, being discretely connected between each two series connected windings.

2. A converter as set forth in claim 1 wherein one of said rectifying devices in each rectifying circuit is a thyristor and is responsive to a turn-on signal, for determining the firing point of that thyristor during a selected half cycle of operation.

3. A converter as set forth in claim 2 further comprising signal means responsive to the voltage across said load circuit for providing said turn-on signal, effecting a turn-on of each said thyristor at a time in each half cycle which is delayed a period which is directly proportional to the voltage across said load.

4. A converter as set forth in claim 3 wherein said signal means comprises a magnetic amplifier, said magnetic amplifier having a control input connected to said load and having a controlled circuit being connected between said signal generating means and a said thyristor.

5. A converter as set forth in claim 3 wherein each said thyristor is an SCR.

* * * * *